United States Patent [19]

Arisaka et al.

[11] 3,954,477
[45] May 4, 1976

[54] FILM UNIT ASSEMBLY
[75] Inventors: Masayuki Arisaka; Hideo Horiuchi, both of Minami-ashigara, Japan
[73] Assignee: Fuji Photo Film Co., Ltd., Minami-ashigara, Japan
[22] Filed: July 18, 1974
[21] Appl. No.: 489,651

[30] Foreign Application Priority Data
Aug. 6, 1973   Japan.............................. 48-88195

[52] U.S. Cl................................. 96/76 R; 354/174
[51] Int. Cl.²........................................... G03C 1/48
[58] Field of Search ........... 354/174, 178, 179, 275, 354/276, 277; 96/76 R, 76 C

[56] References Cited
UNITED STATES PATENTS
1,682,628   8/1928   Romanowicz et al. .............. 354/178
3,636,845   1/1972   Harvey................................. 96/76 C FOREIGN PATENTS OR APPLICATIONS
11,346   5/1907   United Kingdom................. 354/178

Primary Examiner—Fred L. Braun
Attorney, Agent, or Firm—Sughrue, Rothwell, Mion, Zinn & Macpeak

[57] ABSTRACT

A film unit assembly wherein leaders for removal of exposed film units from a pack are made of lightproof material, are each large enough to cover the photosensitive portion of a film unit, and successive leaders extend between successive film units, and provide lightproof protection of rearward film units when a foremost film unit is exposed. One end of the leader between any two film units is attached to the leading end of one film unit, and the other end of the leader is attached to the trailing end of the other film unit, whereby, when an exposed film unit is drawn out of a pack, the exposed film unit simultaneously draws the leader attached thereto out of the pack, and uncovers the next film unit.

3 Claims, 4 Drawing Figures

FILM UNIT ASSEMBLY

BACKGROUND OF THE INVENTION

1. Field of the Invention

The present invention relates to a film unit assembly for employment in a diffusion-transfer process, and more particularly to a film unit assembly permitting simplified construction of film units, and simple removal of film units from a camera.

2. Description of the Prior Art

There is known conventionally a photographic process termed diffusion-transfer process, wherein development, as well as exposure, of a film is effected in a camera, thus making it possible to obtain a positive print of an object almost immediately after a film is exposed. The film employed in this process is constituted by a series of independent, sheet-like units, each of which corresponds to one frame for production of one photograph, and comprises a photosensitive layer, on which a negative image of an object may be formed upon exposure of the layer to light reflected from the object, and a positive image layer, which is in close proximity, or immediate juxtaposition to the photosensitive layer, and is bonded thereto at least along the edges, and onto which an image corresponding to a negative image formed on the photosensitive layer may be transferred under the influence of a suitable processing solution, which is spread between the layers. The processing solution is normally held in a container, which is attached to the photosensitive layer and positive image layer assembly, and is broken open under the action of rolls, or similar pressure means provided in an associated camera, these rolls also causing the processing solution to be spread throughout the film unit, and effecting, or assisting, removal of the film unit from the camera. As well as promoting development of photographic images, the processing solution is generally made viscous, and thus assists bonding of different layers of a film unit. In addition to photosensitive and positive image layers, each film unit usually comprises a transparent support layer, and a light-reflecting layer against which a developed photograph may be viewed. Also, since film units are packed in immediate juxtaposition to one another in a film pack, in order to ensure that, when a foremost film unit is exposed, light does not pass completely through this film unit and partially expose or fog other film units, it is essential to provide means for lightproof protection of successive film units lying to the rear of the exposed film unit. This lifhtproof protection may be provided in the form of an opaque layer incorporated in each film unit, or may be provided as separate lightproof sheets associated with the film units. In one case, construction of a film unit itself is rendered more complex, and in the other case, film unit assembly is made more difficult and in using the film pack, complicated, and a camera having a relatively complex construction is required.

It is accordingly an object of the present invention to provide a film unit assembly permitting simplified film unit construction, and ensuring lightproof protection of film units which it is not intended to expose.

It is another object of the invention to provide a film unit assembly which ensures lightproof protection for film units, but permits simple removal of film units from a pack and camera.

It is further object of the invention to provide a film unit assembly permitting temporary unloading of film units from a camera without risk of exposure thereof.

SUMMARY OF THE INVENTION

In accomplishing these and other objects, there is provided, according to the present invention, a film unit assembly wherein film units, each of which is associated with a container holding film processing solution, and comprises a photosensitive layer and a positive image layer, but does not need to include an opaque layer, are contained in a film pack, which is loadable in a camera, and comprises a large front opening through which successive foremost film units may be exposed, and an end wall slit through which an exposed film unit may be removed from the pack. Removal of film units is effected by leaders, which are made of lightproof, flexible material, and are suitably attached to film units, and each of which is made large enough to cover at least the photosensitive layer of a film unit. Before the pack is loaded into a camera, the foremost film unit is protected by a foremost leader, which is made slightly longer than twice the length of a film unit, and is folded in front of the foremost film unit, thereby preventing entry of light through the pack large front opening. One end of the foremost leader is attached to the foremost film unit, and the other end thereof passes through, and prevents entry of light via, the removal slit in the pack. The other leaders are each made slightly longer than a film unit, and lie between successive film units, one end of each leader, being attached to one end, for example the right-hand trailing end, of one film unit and the other end of the leader being attached to the further removed, left-hand leading end of the next succeeding film unit. When the pack is loaded in a camera, the foremost leader is withdrawn from the pack, but is not detached from the foremost film unit, which may now be exposed. When the foremost film unit is exposed, the foremost leader is drawn further and pulls the foremost film unit out of the pack and into engagement with rolls, or similar means, which cause the processing solution container associated with the foremost film unit to be broken open, and processing solution to be spread between the film unit's photosensitive and positive image layers, and a photographic image to be formed on the positive image layer, in a conventionally known manner. At the same time, the next succeeding film unit is advanced to a foremost position in the pack relative to the object being photographed, by a spring or similar means, and the exposed film unit draws the leader hitherto lying in front of this next film unit out of the pack, but not out of attachment with that next film unit. As the exposed film unit continues to be moved out of the camera, it is detached from the leader connecting it to the next film unit. When this next film unit is exposed, it is drawn out of the pack by the leader attached thereto, at the same time, removal of this film unit causing the next leader to be drawn out of the pack, and the next film unit to be uncovered, and so on for other film units. Thus, the leaders for removal of film units being lightproof and sufficiently large to cover photosensitive portions of film units, when each film unit is exposed other film units behind the exposed film unit are protected from light, without it being necessary to incorporate lightproof layers in film units, or to provide separate lightproof means. On the other hand, constuction of the associated camera is not made complicated, and may simply be a construction normally employed in association with conventional leader-type film unit assemblies.

In another embodiment of the invention each leader provided between film units has a length at least twice that of a film unit. Between any two film units, one half of the leader lies on and covers the forward side of the rear film unit, and the other half thereof is folded between the two film units, opposite ends of the leader being attached to opposite trailing ends of the forward and rear film units, as before. In this embodiment, when a film unit is exposed and removed from the pack, the folded half of the leader connecting to the next film unit is drawn out flat, whereby the next film unit remains protected by two leader layers, and, if the pack is unloaded from the camera at this stage, film units remaining in the pack are protected from exposure, and so are useable upon subsequent reloading of the pack into a camera.

BRIEF DESCRIPTION OF THE DRAWINGS

A better understanding of the present invention may be had from the following full description, when read in conjunction with the attached drawings, in which like elements are given like numerical designations.

DESCRIPTION OF PREFERRED EMBODIMENTS

Figure 1:
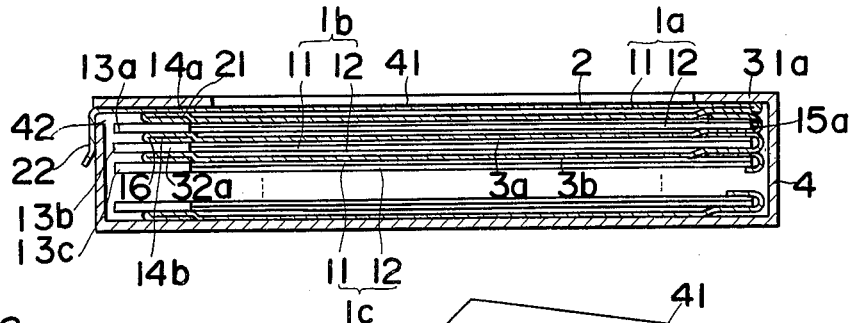
FIG. 1 is a cross-sectional view of a film unit assembly according to a first embodiment of the invention, and contained in a pack.

Referring to FIG. 1, each film unit 1 of the assembly comprises a photosensitive layer 11 and a positive image layer 12, which together form a flat sheet, and to the leading end of which there is attached a container 13 holding a solution of photographic processing chemicals, the leading end of the film unit 1 being indicated as the left-hand end in the drawing, and being that end thereof which leads when the film unit 1 is moved out of a camera. Film units 1 are held in flat alignment, with the photosensitive layers 11 thereof foremost, in a pack 4, and relative to the object being photographed are urged towards the front of the pack 4 by a spring and pressure plate, or other suitable means, not shown, provided in the pack 4.

Figure 2:
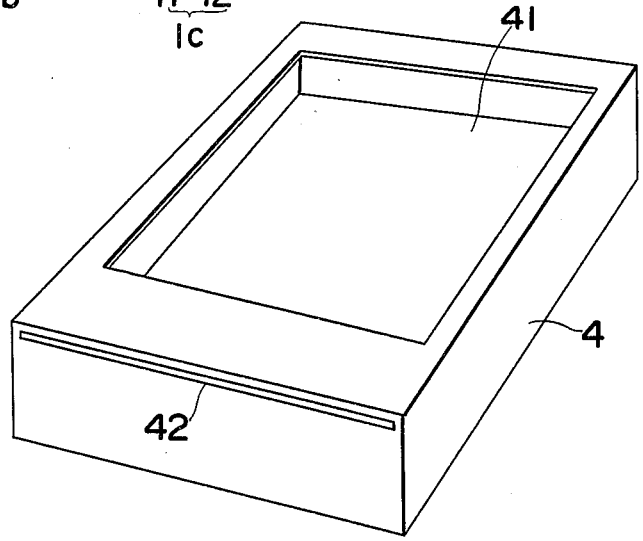
FIG. 2 is a perspective view of a film pack associable with a film unit assembly of the invention.

As shown in FIG. 2, the pack 4 is in the general form of a flat, rectangular case, within the front wall of which there is formed a large opening 41, which corresponds in size to the photosensitive portion of a film unit 1, and through which successive film units 1 may be exposed to light directed through the lens of a camera (not shown) in which the pack 4 is loaded. Adjacent to the front edge of the leading end wall of the pack 4 there is formed a long slit 42, through which successive film units 1 may be drawn from the pack 4 in a manner as described later.

Referring back to FIG. 1, removal of film units 1 from the pack 4 and protection thereof from undesired exposure is effected by a foremost leader 2 and intermediate leaders 3. For convenience, identifying the first three film units 1, from front to rear, in the pack 4 as film units 1a, 1b, 1c, the foremost film unit 1a is connected to and protected by the foremost leader 2 prior to loading of the pack 4 into a camera. The foremost leader 2 is at least equal in breadth to that of film unit 1, is made twice the length of a film unit 1, or at least of the photosensitive portion thereof, and is folded double in front of the foremost film unit 1a. One trailing end portion 21 of the foremost leader 2 is bent around, and is bonded firmly, but not fixedly to the foremost film unit leading end 14a, on or adjacent to the processing solution container 13a of the film unit 1a. The other leading end portion 22 of the leader 2 extends through the slit 42 to the outside of the pack 4, and is lightly bonded to the pack leading end wall. The foremost leader 2 thus normally seals the pack large front opening 41 and slit 42, but may be drawn out of the pack 4 via the slit 42, and so uncover the film unit 1a. Since the trailing end portion 21 of the leader 2 is bent before being attached to the film unit 1a, when the leader 2 is drawn out of the pack 4, the trailing end portion 21 thereof becomes flat with respect to the film unit 1a, and so is not liable to be detached too easily from the film unit 1a.

Still in FIG. 1, between the foremost film unit 1a and the next film unit 1b, there is provided an intermediate leader 3a, which is at least equal in breadth to, and is approximately equal in length to that of film unit 1. One leading end 31a of the intermediate leader 3a is firmly, but not fixedly, bonded to the forward side of the right-hand trailing end portion 15a of the film unit 1a. The intermediate leader 3a is passed around and covers the foremost film unit right-hand end 15a, and passes behind and extends the length of the film unit 1a. The other trailing end 32a of the leader 3a is bent round, and is firmly, but not fixedly attached to the left-hand leading portion 14b of the next film unit 1b. Attachment between the leader 3a and the film unit 1a is made slightly weaker than attachment between the leader 3a and the film unit 1b, whereby the leader 3a may be detached more easily from the film unit 1a than from the film unit 1b. Another intermediate leader 3b is similarly provided between and attached at opposite ends to the film units 1b and 1c, and so on for other film units.

When the pack 4 containing film units 1 is loaded in a camera, first, the outer leading end portion 22 of the foremost leader 2 is detached from the leading end wall of the pack 4, and the leader 2 is drawn through the slit 42 and out of the pack 4, and uncovers, but is not detached from the foremost film unit 1a, which may now be exposed to light directed through the camera lens the film unit 1a, together with other film units, being moved forwards, by spring or other means provided in the pack 4, a distance equal to the folded thickness of the leader 2, simultaneously with withdrawal of the leader 2 from the pack 4. After the camera shutter is actuated to expose the film unit 1a, the leader 2 is pulled away from the pack 4, and draws the film unit 1a into engagement with processing rolls or similar means provided in the camera for effecting transfer and production of a photographic image on the positive image layer 12a of the film unit 1a. At the same time, the film unit 1a draws the intermediate leader 3a out of the pack 4, thus uncovering the next film unit 1b, which is simultaneously moved forwards to a position for correct exposure by the pack spring or other means not shown. As the film unit 1a is moved further from the pack 4, and out of the camera, it is pulled out of attachment with the intermediate leader 3a. The leader 3a, however, remains in attachment with the film unit 1b, and, when the film unit 1b is exposed, may draw the film unit 1b out of the pack 4, and into engagement with the camera processing means, whereupon the film unit 1b draws the intermediate leader 3b out of the pack 4, and is subsequently detached therefrom. The film unit 1c is now uncovered, and after exposure is removed and uncovers the next film unit 1, in the same manner as described above, and so on for subsequent film units 1.

Figure 3:
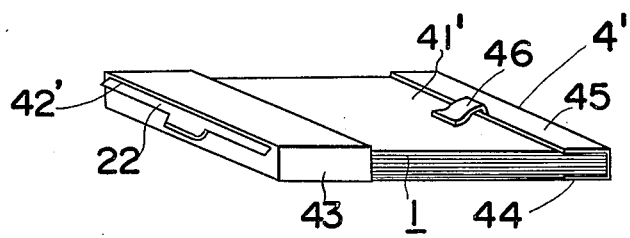
FIG. 3 is a perspective view of another type of pack associable with a film unit assembly of the invention.

The film unit assembly described above may also be contained in a different type of film pack 4', as shown in FIG. 3. The film pack 4' comprises a rear wall 44, one end of which is bent through two right-angles to form a bracket-shaped retainer portion 45. Film units 1, which are assembled together with leaders 2 and 3 as described above, are stacked against the rear wall 44, the right-hand ends thereof being inserted in the retainer portion 45. The left-hand ends of the film units 1 and of the rear wall 44 are enclosed in a sheath 43, which is in the general form of a small case open at one side, and which may be slid onto or off the film unit assembly and rear wall 44 left-hand end. On the forward side of the pack 4', the area between the sheath 43 and retainer portion 45 is equal to that of a photosensitive layer 11 of a film unit 1, and in effect constitutes an exposure opening 41'. Adjacent to the front edge of the left-hand wall of the sheath 43 there is formed a slit 42', through which the leading end portion 22 of the foremost leader 2 extends, and via which leaders 2 and 3 and exposed film units 1 may be drawn from the pack 4'. Film units 1 are urged towards the front of the pack 4' by a spring means, not shown, which is provided on the rear wall 44, and exerts sufficient pressure to ensure that film units 1 and leaders 2 and 3 are held tightly together, whereby, since the leaders 2 and 3 are lightproof and have dimensions sufficient to cover photosensitive portions of the film units 1, light is prevented from reaching and partially exposing film units 1 prior to loading of the pack 4' in a camera. To help hold the foremost leader 2 in place, there is provided a seal element 46, which is attached at one end to the forward side of the retainer portion 45 and at the other end to the foremost leader 2, and which is detached from the leader 2 when the pack 4' is loaded in a camera, whereafter the leader 2 may be drawn out of the pack 4', the photosensitive layer 11a of the foremost film unit 1a thus becoming exposable through the exposure opening 41'.

Figure 4:
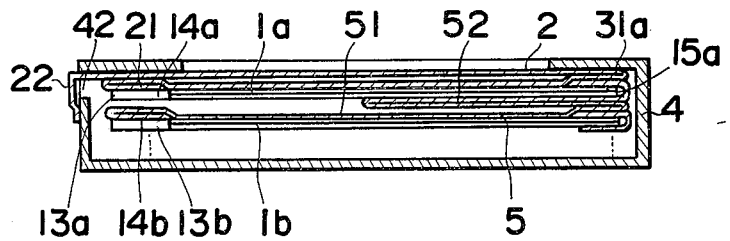
FIG. 4 is a cross-sectional view of a film unit assembly according to a second embodiment of the invention.

In taking photographs, after a certain number, but not all of the film units contained in a loaded pack have been exposed, it may be required to unload the pack, and load another pack containing film units having different sensitiveity, in order to photograph objects in different light conditions, for example. With the film unit assembly and packs described above, it is evident that if the film assembly is thus unloaded from a camera, the film unit which is currently foremost will be completely exposed, and so rendered unuseable. However, a second embodiment of the invention shown in FIG. 4, to which reference is now had, makes it possible to unload film packs from a camera without risk of exposure of any of the remaining film units.

In this embodiment, film units 1 and the foremost leader 2 are the same as in the first embodiment, but there are provided intermediate leaders 5, each of which is at least twice the length of a film unit 1. The intermediate leaders 5 are attached at opposite ends to successive film units 1 in the same manner as described in reference to the first embodiment, and also form doubled portions between film units 1. For example, the intermediate leader 5 between successive film units 1a and 1b comprises a flat portion 51, which lies against and covers the forward, photosensitive side of the film unit 1b, and is also folded to form a doubled portion 52, which lies between the right-hand halves of the film units 1a and 1b. When the film unit 1a is exposed and removed from the pack 4, the doubled portion 52 of the leader 5 is unfolded and drawn out parallel to the flat portion 51. After this the film unit 1a is detached from the intermediate leader 5, which therefore remains folded in front of the film unit 1b, which is now foremost. To expose the film unit 1b, the intermediate leader 5 is first drawn out of the pack 4 in the same manner as the foremost leader 2, or, if it is wished to unload the pack 4, the leader 5 is left in front of the film unit 1b, which therefore remains protected from exposure and is subsequently useable. In other words, in this embodiment, intermediate leaders 5, as well as ensuring protection of rearward film units when a foremost film unit is exposed, also serve the same function as a foremost leader 2, and so permit unloading of a pack without risk of exposure of any film units therein.

As is clear from the above description, the present invention provides a film unit assembly which is associable with a conventional camera, but permits simplified film unit construction while ensuring lightproof protection of film units not required to be exposed.

What is claimed is:

1. In a film unit assembly employing leaders for removal of successive exposed film units from a pack loaded in a camera, said pack including a front film exposure opening and a film unit discharge side slit to one side thereof through which film units move after exposure of the film unit stacked film units having photosensitive portions facing forwardly toward the object to be photographed for exposure through said front opening and removal laterally, in sequence, through said side slit, the improvement comprising: a film unit assembly wherein each said leader is made of a lightproof material having a leading and a trailing end, has dimensions at least sufficient to cover the photosensitive portions of a film unit, is attached at its leading end to the trailing end of a film unit, extends behind said film unit, and is attached at its trailing end to the leading end of the succeeding film unit, successive leaders being provided between successive film units, and wherein the trailing end of each leader is reversely bent and firmly bonded to the leading end of the succeeding film unit, whereby film units other than a foremost film unit are protected from light upon exposure of said foremost film unit, and removal of said foremost film unit from said pack causes said leader attached thereto to be drawn out of said pack and uncover the photosensitive portion of the next film unit, and with the trailing end being reversely bent where it is attached to the succeeding film unit, the trailing end portion thereof flattens with respect to the succeeding film unit to resist easy detachment from said succeeding film unit is drawn out of pack.

2. A film unit assembly as recited in claim 1, wherein a foremost leader is at least twice the length of a film unit, is attached at its trailing end to the leading end of the foremost film unit in said pack, is folded in front of said foremost film unit, and the leading end of which extends out of said pack, whereby said foremost film unit is protected from exposure prior to loading of said pack in a camera, and said foremost leader may be drawn out of said pack to uncover said foremost film unit.

3. A film unit assembly as recited in claim 1, wherein each of said leaders is made at least twice the length of a film unit, and between any two said film units one half of said leader lies against and covers the photosensitive portion of the rear film unit and one half thereof is folded between said film units, whereby successive film units are not immediately uncovered upon removal of preceding exposed film units from said pack, and therefore the remaining film units may be removed from a camera without being exposed.

* * * * *